United States Patent
Zhao et al.

(10) Patent No.: US 11,906,392 B2
(45) Date of Patent: Feb. 20, 2024

(54) IN-VEHICLE STABLE PLATFORM SYSTEM EMPLOYING ACTIVE SUSPENSION AND CONTROL METHOD THEREOF

(71) Applicant: Yanshan University, Qinhuangdao (CN)

(72) Inventors: Dingxuan Zhao, Qinhuangdao (CN); Mingde Gong, Qinhuangdao (CN); Shuang Liu, Qinhuangdao (CN); Zhiguo Sun, Qinhuangdao (CN); Zhuxin Zhang, Qinhuangdao (CN); Bin Yang, Qinhuangdao (CN); Tao Ni, Qinhuangdao (CN); Qinghe Guo, Qinhuangdao (CN); Mengke Yang, Qinhuangdao (CN)

(73) Assignee: YANSHAN UNIVERSITY, Qinhuangdao (CN)

( * ) Notice: Subject to any disclaimer, the term of this patent is extended or adjusted under 35 U.S.C. 154(b) by 766 days.

(21) Appl. No.: 16/980,002

(22) PCT Filed: Aug. 1, 2019

(86) PCT No.: PCT/CN2019/098906
§ 371 (c)(1),
(2) Date: Sep. 11, 2020

(87) PCT Pub. No.: WO2020/052366
PCT Pub. Date: Mar. 19, 2020

(65) Prior Publication Data
US 2021/0008941 A1    Jan. 14, 2021

(30) Foreign Application Priority Data

Sep. 10, 2018 (CN) .......................... 201811051382.5
Aug. 1, 2019 (CN) .......................... 201910708270.0

(51) Int. Cl.
*G01M 17/04* (2006.01)
*B60G 17/00* (2006.01)
(Continued)

(52) U.S. Cl.
CPC ........... *G01M 17/04* (2013.01); *B60G 17/018* (2013.01); *B60G 17/0152* (2013.01);
(Continued)

(58) Field of Classification Search
CPC .............. G01M 17/04; B60G 17/0152; B60G 17/0161; B60G 17/018; B60G 17/0195;
(Continued)

(56) References Cited

U.S. PATENT DOCUMENTS

| | | | |
|---|---|---|---|
| 2004/0112659 A1* | 6/2004 | Kramer ................ | B60G 11/265 180/89.12 |
| 2006/0136107 A1* | 6/2006 | Kim ..................... | B60G 17/018 280/5.507 |

(Continued)

*Primary Examiner* — Mahmoud S Ismail
(74) *Attorney, Agent, or Firm* — IPRO, PLLC

(57) ABSTRACT

An in-vehicle stable platform system employing active suspension and a control method thereof is provided. The system includes a vehicle body, an in-vehicle stable platform, an inertial measurement device, an electronic control device, a servo controller set, multiple wheels, and suspension servo actuation cylinders and displacement sensors respectively corresponding to the wheels. The wheels are divided into three groups, which form three support points. The heights of the three support points are controlled to control orientation of the vehicle body. An amount of extension/retraction of the suspension servo actuation cylinders required to cause the in-vehicle stable platform to return to a horizontal level is calculated according to a measured pitch angle and a roll angle of the in-vehicle stable platform, and when a vehicle travels on an uneven road, the extension/retraction of each suspension servo actuation cyl-
(Continued)

inder is controlled to cause the in-vehicle stable platform to be horizontal.

3 Claims, 5 Drawing Sheets

(51) Int. Cl.
    *B60G 17/015* (2006.01)
    *B60G 17/016* (2006.01)
    *B60G 17/018* (2006.01)
    *B60G 17/0195* (2006.01)

(52) U.S. Cl.
    CPC ..... *B60G 17/0161* (2013.01); *B60G 17/0195* (2013.01); *B60G 17/015* (2013.01); *B60G 2202/413* (2013.01); *B60G 2204/62* (2013.01); *B60G 2400/0511* (2013.01); *B60G 2400/0512* (2013.01); *B60G 2400/252* (2013.01); *B60G 2500/30* (2013.01); *B60G 2600/182* (2013.01); *B60G 2600/602* (2013.01); *B60G 2800/01* (2013.01)

(58) Field of Classification Search
    CPC ............ B60G 17/015; B60G 2202/413; B60G 2204/62; B60G 2400/0511; B60G 2400/0512; B60G 2400/252; B60G 2500/30; B60G 2600/182; B60G 2600/602; B60G 2800/01
    USPC .......................................................... 701/37
    See application file for complete search history.

(56) References Cited

U.S. PATENT DOCUMENTS

2010/0228422 A1* 9/2010 Gartner ................ B60G 17/018
    701/31.4
2011/0035105 A1* 2/2011 Jolly .................. B60G 17/0185
    701/37

\* cited by examiner

IN-VEHICLE STABLE PLATFORM SYSTEM EMPLOYING ACTIVE SUSPENSION AND CONTROL METHOD THEREOF

TECHNICAL FIELD

This disclosure relates to the technical field of vehicle control, in particular to an in-vehicle stable platform system employing active suspension and a control method thereof.

BACKGROUND

For many special-purpose vehicles, an in-vehicle operation platform enables to maintain horizontal during movement, which brings about great significance for the improvement of operation quality and operation efficiency. As an example of a wheeled crane, it can carry out lifting operation while traveling. As traveling, if the road surface is uneven, a chassis and a crane boom on an upper vehicle body will pitch or roll, to cause a large swing of the lifting heavy objects. This situation usually slows down the operation speed, and arises a risk of collision or roll over in serious cases to cause operation accidents. If the chassis of the crane enables to maintain horizontal when crossing an uneven road, it will be beneficial to the smooth lifting and the accurate placement of the objects to be lifted, thus greatly improving the operation efficiency and operation quality. However, there is no technology now at home and abroad to keep the chassis or the vehicle platform horizontal during the vehicle travels on the uneven road.

SUMMARY

The technical problem to be solved by the present disclosure is to provide an in-vehicle stable platform system employing active suspension and a control method thereof, which can measure a pitch angle and a roll angle of the platform in real time during traveling, and thereby calculating the amount of extension/retraction of suspension servo actuation cylinders required to permit the in-vehicle stable platform to return to a horizontal level, and controlling the extension/retraction of the suspension servo actuation cylinders to maintain the in-vehicle stable platform horizontal during traveling.

To solve the above technical problems, the technical solution adopted by the present disclosure is as follows:

An in-vehicle stable platform system employing active suspension includes a vehicle body, an in-vehicle stable platform fixedly connected with the vehicle body, an inertial measurement device, an electronic control device, a servo controller set, a plurality of wheels, suspension servo actuation cylinders corresponding to the wheels one by one, and displacement sensors, wherein the inertial measurement device is fixed on the in-vehicle stable platform; the wheels are connected to a lower part of the vehicle body via the suspension servo actuation cylinders; the displacement sensors are used to measure strokes of the suspension servo actuation cylinders; the electronic control device and servo controller set are fixed on the vehicle body; the electronic control device is in communication with the inertial measurement device and the servo controller set; and the servo controller set is in communication with the displacement sensors; the electronic control device reads a pitch angle and a roll angle of the in-vehicle stable platform measured by the inertial measurement device, and thereby calculating an amount of extension/retraction as required by the suspension servo actuation cylinders when the in-vehicle stable platform returns to a horizontal state, and outputting the amount of extension/retraction to the servo controller set to control the extension/retraction of each of the suspension servo actuation cylinders, so as to permit the in-vehicle stable platform as traveling to maintain horizontal.

A further improvement of the afore-mentioned technical solution of the present disclosure is that all of the wheels are divided into three wheel groups, each wheel group has one wheel or more wheels, when the number of wheels of the wheel group is greater than one, all of the suspension servo actuation cylinders in the wheel group are communicated in parallel, so that the wheel group forms a support point for supporting the vehicle body, the three wheel groups form three support points, and orientation of the vehicle body is controlled based on a principle that one plane is determined three points.

A further improvement of the afore-mentioned technical solution of the present disclosure is that when the wheel groups are formed, the structures of the wheels in the wheel groups and the suspension servo actuation cylinders corresponding thereto and the displacement sensors are the same; and the support point in each of the wheel groups for supporting the vehicle body is a geometric center point of support points of the suspension servo actuation cylinders in the group for supporting the vehicle body; and a height of the support point is controlled by controlling an average amount of the extension/retraction of the suspension servo actuation cylinders in the group.

A control method of the in-vehicle stable platform system employing active suspension according to any one of claims 2-3, characterized in that, establishing a coordinate system OXYZ fixedly connected with a vehicle body, wherein a coordinate origin O of the coordinate system is any point fixedly connected with the vehicle body, and an upward direction passing through the coordinate origin O and perpendicular to a plane where the in-vehicle stable platform is located is defined as a Z-axis positive direction, a forward direction of the vehicle is a Y-axis positive direction, and a right direction in which the vehicle travels is a X-axis positive direction, a heaving displacement of the in-vehicle stable platform along the Z-axis is set as w, a rotation angle around the X-axis is set as $\alpha$, and a rotation angle around the Y-axis is set as $\beta$; a scanning period is preset in the inertial measurement device, and a control method includes following steps of:

1) in some scanning period, the inertial measurement device measures a pitch angle $\alpha_0$ and a roll angle $\beta_0$ of the in-vehicle stable platform and outputs them to the electronic control device;
2) the electronic control device performs a first-order low-pass filtering with a cutoff frequency $f_L$ on the pitch angle $\alpha_0$ and the roll angle $\beta_0$, and a filtered pitch angle is $\alpha_L$, and a filtered roll angle is $\beta_L$;
3) according to values $\alpha_L$ and $\beta_L$ obtained in step 2), w=0 and $-\alpha_L$, $-\beta_L$ are taken as relative correction values of a orientation of the in-vehicle stable platform, a target value of an average amount of the extension/retraction of the suspension servo actuation cylinders in each of the wheel groups is calculated through an inverse kinematics algorithm of a vehicle suspension mechanism with three support points, and the target value is transmitted to the servo controller set so as to perform displacement servo control on each of the suspension servo actuation cylinders, such that the in-vehicle stable platform is permitted to maintain horizontal during traveling.

A further improvement of the afore-mentioned technical solution of the present disclosure is that the coordinate origin O is a geometric center of wheel grounding points when the vehicle is in a horizontal state.

Due to the adoption of the technical solution, the present disclosure has achieved technical progress below.

According to the present disclosure, an inertial measurement device is mounted on the in-vehicle stable platform to measure the pitch angle and the roll angle of the platform during the vehicle travels, thereby calculating the amount of extension/retraction of respective suspension servo actuation cylinders required to cause the in-vehicle stable platform to return to a horizontal level, and controlling the extension/retraction of the respective suspension servo actuation cylinders to maintain the in-vehicle stable platform horizontal during traveling.

The in-vehicle stable platform based on active suspension and a control method thereof as proposed by the present disclosure play an important role in improving the operation technical level of special-purpose vehicles. Several typical special-purpose vehicles are taken as examples to make an illustration, for example, when it is applied to an elevating fire engine, the function of working while traveling, which is not available at present can be realized, because a chassis of the elevating fire engine does not have the ability to keep horizontal as traveling, the inclination of the upper arm frame may be caused when the vehicle travels over a road obstacle, which might lead to the difficulty of aiming the fire gun at the fire area, or even the danger of falling down for firemen who climbs to extinguish the fire. When it is applied to a wheeled crane, the tilt of the crane arm and the swing of the hoisted object caused because of an uneven ground can be reduced when the vehicle performs lifting work on the uneven road and in the wild, so as to greatly improve the operation efficiency and quality. When it is applied to an ambulance, the maladjustment or secondary injury to patients in emergency caused by bumps and inclinations of the vehicle body can be reduced when the vehicle travels on the uneven road. When it is applied to a special assault vehicle, an external shooting accuracy of a commando on the assault vehicle can be improved when the assault vehicle travels on the uneven road. When it is applied to a photographic vehicle, the stability of photographic lens mounted on the photographic vehicle can be maintained when the photographic vehicle travels over the uneven road, thus improving the photographic quality and so on.

DETAILED DESCRIPTION

Hereinafter, the present disclosure will be further described in detail with reference to embodiments:

The present disclosure provides an in-vehicle stable platform system employing active suspension and a control method thereof, which are suitable for active suspension vehicles with three or more wheels. According to a principle that a plane is determined by three points, the wheels are divided into three groups, which constitute three support points for supporting the vehicle body. A orientation of the vehicle body is controlled by controlling heights of the three support points, so that the in-vehicle stable platform maintains horizontal when traveling on an uneven road.

The specific method is as follows: the wheels are divided into three groups, each of the wheel groups has one wheel or more wheels. When the number of wheels in some wheel group is greater than one, all of the suspension servo actuation cylinders in the wheel group are connected in parallel, that is, the upper chambers of the suspension servo actuation cylinders in the wheel group are communicated with each other in turn, and the lower chambers of the suspension servo actuation cylinders in the wheel group are also communicated with each other in turn. The wheel group forms a support point for supporting the vehicle body, and three wheel groups form three support points. When the wheel groups are formed, the structures of the wheels in the wheel group and the suspension servo actuation cylinders corresponding thereto and the displacement sensors are the same, so that the support point of each of the wheel groups is a geometric center point of the support point of each of the suspension servo actuation cylinders to the vehicle body in the group, and the height of the support point can be controlled by controlling the average amount of extension/retraction of each suspension servo actuation cylinder in the group.

According to the measured pitch angle and roll angle of the in-vehicle stable platform, the electronic control device calculates the amount of extension/retraction of the respective suspension servo actuation cylinders required to cause the in-vehicle stable platform to return to a horizontal level, and controls the extension/retraction of the respective suspension servo actuation cylinders to maintain the in-vehicle stable platform horizontal when traveling on an uneven road.

Now, illustration is made as examples of three-wheeled and six-wheeled vehicles, an in-vehicle stable platform system and a control method the vehicle with more than three wheels can be constructed according to the same principle and method as above mentioned.

Figure 1:
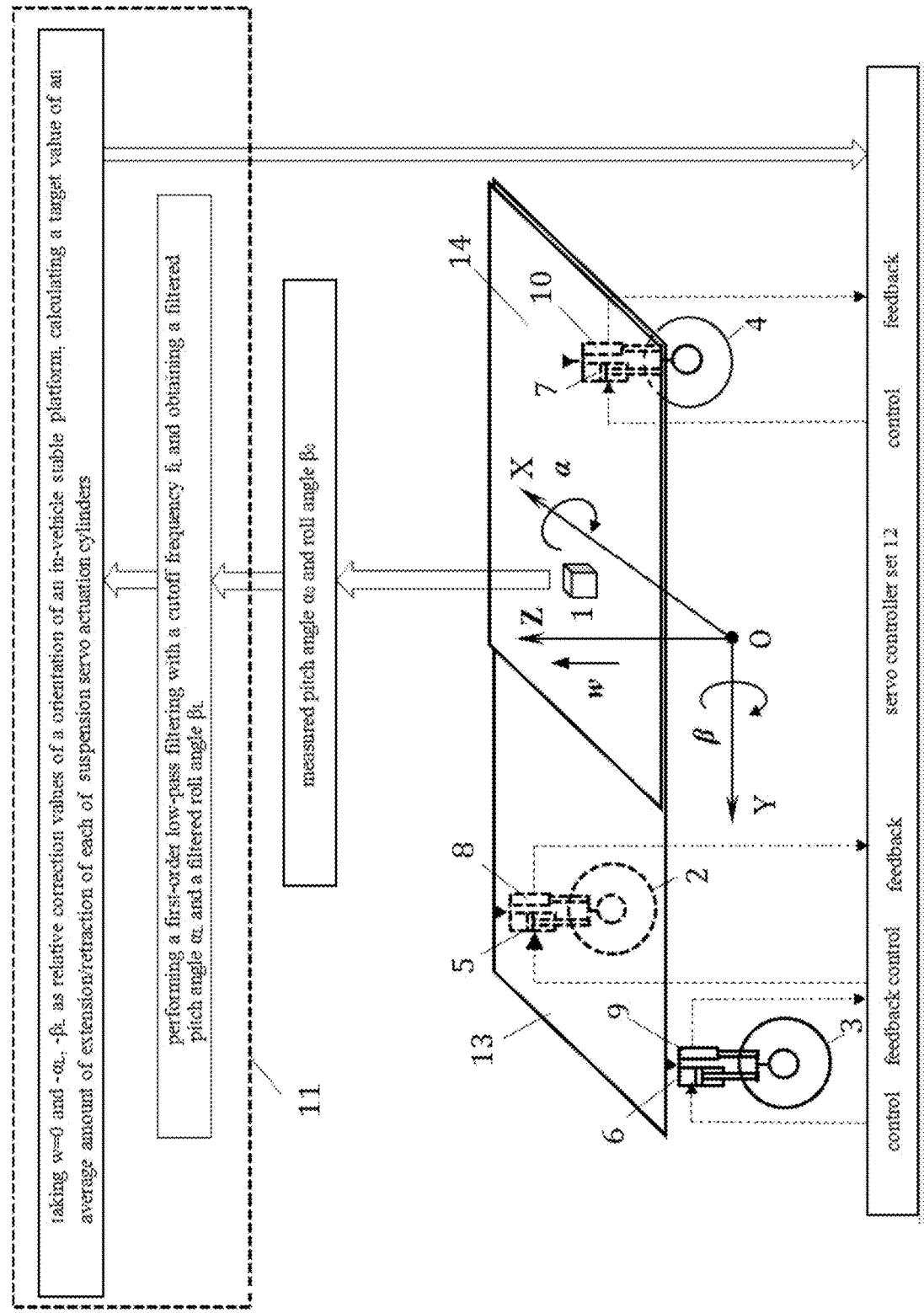
FIG. 1 is a structural schematic view of an in-vehicle stable platform system employing active suspension.

Embodiment one: in-vehicle stable platform based on active suspension for a three-wheeled vehicle and control method thereof As shown in FIG. 1, the system includes: a vehicle body 13, a in-vehicle stable platform 14 fixedly connected with the vehicle body, an inertial measurement device 1, wheels 2, 3, 4 and suspension servo actuation cylinders 5, 6, 7 corresponding to the wheels 2, 3, 4 one by one, corresponding displacement sensors 8, 9, 10, an electronic control device 11 and a servo controller set 12. The inertial measurement device 1 is fixed on the in-vehicle stable platform 14. The wheels 2, 3, 4 are connected to the lower part of the vehicle body via the suspension servo cylinders 5, 6, 7, respectively. The displacement sensors 8, 9, 10 are used to measure the strokes of the suspension servo cylinders 5, 6, 7 respectively and form measurement signals. The electronic control device 11 and the servo controller set 12 are fixed on the vehicle body 13. The electronic control device 11 is in communication with the inertial measurement device 1 and the servo controller set 12. The servo controller set 12 is in communication with the displacement sensors 8, 9, 10, and receives measurement signals of the displacement sensors. The electronic control device 11 reads the orientation parameters measured by the inertial measurement device 1, calculates the amount of extension/retraction of the respective suspension servo actuation cylinders required to cause the in-vehicle stable platform to return to a horizontal level, and outputs it to the servo controller set 12 to control the extension/retraction of the respective suspension servo actuation cylinders to maintain the in-vehicle stable platform horizontal during traveling.

This embodiment concerns a three-wheeled vehicle. Each of the wheels and the suspension servo actuation cylinder thereof can form a support point for the vehicle body. In this embodiment, the orientation of the vehicle body may be controlled according to the principle that a plane is determined by three points.

In the present disclosure, the inertial measurement device 1 may be a component, such as an inertial measurement unit, a gyroscope, which is capable of measuring inertial parameters; and the electronic control device 11 may be a component, such as an electronic control unit, which is capable of receiving, storing, calculating and outputting data parameters.

The control method of the present disclosure is to establish a coordinate system OXYZ fixedly connected with the vehicle body. As shown in FIG. 1, the coordinate origin O of the coordinate system is defined as a geometric center of all the wheel grounding points when the vehicle is horizontal. Certainly, the coordinate origin O can also be any point fixedly connected with the vehicle body; a positive direction of Z-axis is defined as an upward direction passing through the coordinate origin O and perpendicular to the plane where the in-vehicle stable platform is located when the vehicle is horizontal; a positive direction of Y-axis is a forward direction of the vehicle; a right direction when the vehicle moves forward is the positive direction of X-axis. A heaving displacement of the in-vehicle stable platform along Z-axis is defined as w; a rotation angle around X-axis, i.e. the pitch angle is defined as $\alpha$; and a rotation angle around Y-axis, i.e. the roll angle is defined as $\beta$. Scanning period are preset in the inertial measurement device 1. The specific control method of this embodiment includes the following steps:

In the first step, in each of the scanning periods, the inertial measurement device 1 measures the pitch angle $\alpha_0$ and the roll angle $\beta_0$ and outputs them to the electronic control device 11;

In the second step, the electronic control device 11 performs first-order low-pass filtering with a cutoff frequency $f_L$ on the pitch angle $\alpha_0$ and roll angle $\beta_0$, and a filtered pitch angle is $\alpha_L$, a filtered roll angle is $\beta_L$. The first-order digital low-pass filtering adopts the following recursive algorithm:

$$y_n = \alpha x_n + (1-\alpha) y_{n-1}$$

wherein $x_n$ is a sampling value of $\alpha_0$ or $\beta_0$ in the current scanning period, $y_n$ is a calculation value of $\alpha_0$ or $\beta_0$ in the current scanning period, $y_{n-1}$ is a calculation value of $\alpha_0$ or $\beta_0$ in the previous scanning period, and $\alpha$ is a filter coefficient.

In the case that the cut-off frequency $f_L$ is determined, the calculation method of $\alpha$ is:

$$\alpha = 2\pi f_L \Delta t$$

wherein $\Delta t$ is the scanning period, the unit of which is s; $f_L$ is a cut-off frequency, the unit of which is Hz.

In the third step, according to the values of $\alpha_L$ and $\beta_L$ obtained in the previous second step, the electronic control device 11 takes w=0 and $-\alpha_L$ and $-\beta_L$ as the relative correction values of the orientation of the in-vehicle stable platform, calculates the target values of the amount of extension/retraction of the suspension servo actuation cylinders 5, 6, 7 of the vehicle, and transmits the target values to the servo controller set 12 to perform displacement servo control on the suspension servo actuation cylinders 5, 6, 7, so as to cause the in-vehicle stable platform to be horizontal during traveling. The target values of the amount of the extension/retraction of the suspension servo actuation cylinders can be calculated by the inverse kinematics algorithm of a vehicle suspension mechanism with the three support points. When the servo controller set performs displacement control on the respective suspension servo actuation cylinders, the extension/retraction of the suspension servo actuation cylinders is controlled according to the target values of the strokes and the amount of extension/retraction of the suspension servo actuation cylinders measured by the displacement sensor.

Figure 2:
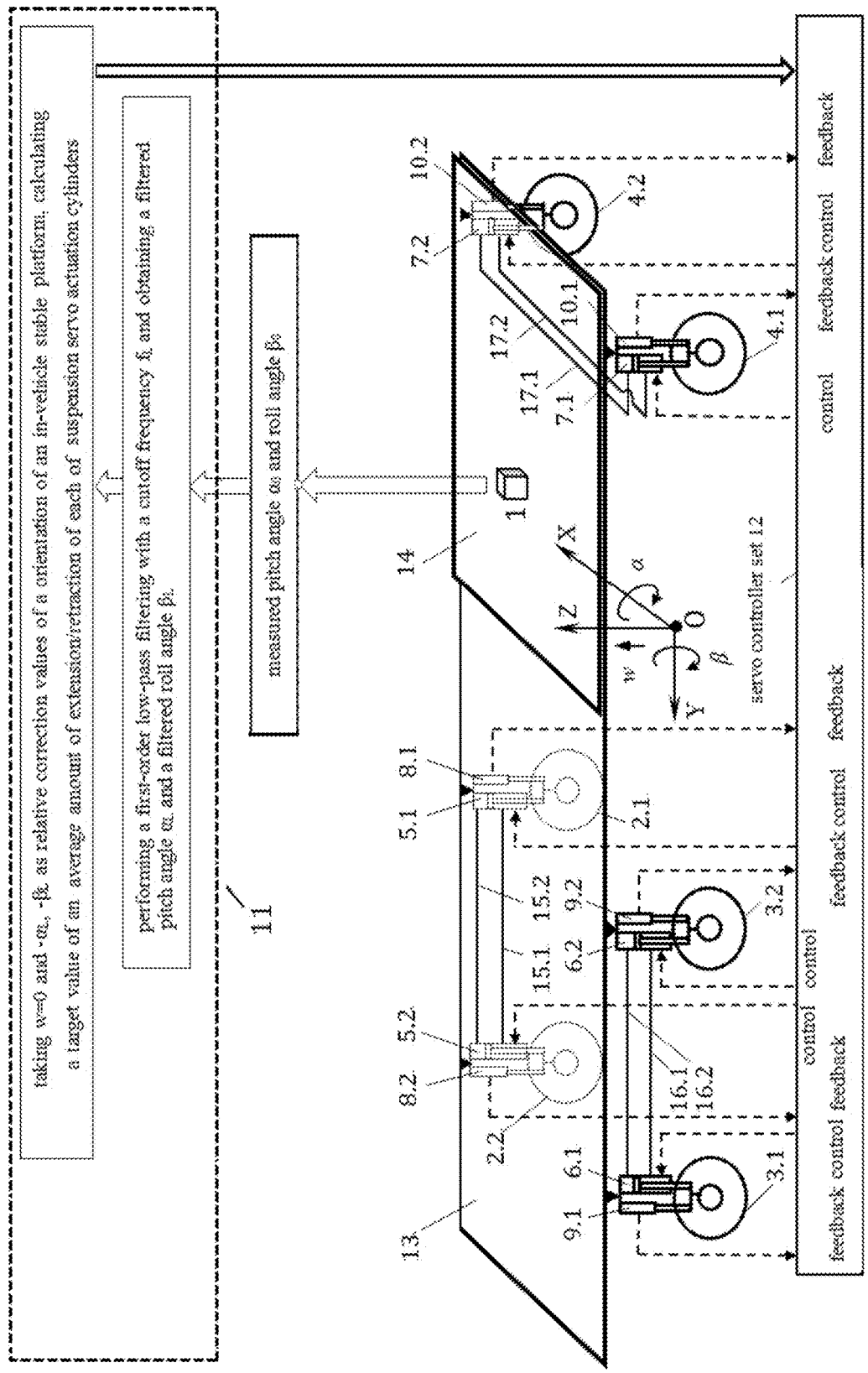
FIG. 2 is a structural schematic view of in-vehicle stable platform system employing active suspension of a six-wheeled vehicle.

Embodiment two: in-vehicle stable platform based on active suspension for six-wheeled vehicles and control method thereof As shown in FIG. 2, the system includes: a vehicle body 13, an in-vehicle stable platform 14 fixedly connected with the vehicle body, an inertial measurement device 1, an electronic control device 11, a servo controller set 12, wheels 2.1, 2.2, 3.1, 3.2, 4.1, 4.2, suspension servo actuation cylinders 5.1, 5.2, 6.1, 6.2, 7.1, 7.2 corresponding to the wheels 2.1, 2.2, 3.1, 3.2, 4.1, 4.2 one by one, and corresponding displacement sensors 8.1, 8.2, 9.1, 9.2, 10.1, 10.2. The inertial measurement device 1 is fixed on the in-vehicle stable platform 14. The wheels 2.1, 2.2, 3.1, 3.2, 4.1, 4.2 are connected to the lower part of the vehicle body via the suspension servo cylinders 5.1, 5.2, 6.1, 6.2, 7.1, 7.2, respectively. The displacement sensors 8.1, 8.2, 9.1, 9.2, 10.1, 10.2 are used to measure strokes of the suspension servo actuation cylinders 5.1, 5.2, 6.1, 6.2, 7.1, 7.2, respectively. The electronic control device 11 and the servo controller set 12 are fixed on the vehicle body 13. The electronic control device 11 is in communication with the inertial measurement device 1 and the servo controller set 12. The servo controller set 12 is in communication with the displacement sensors 8.1, 8.2, 9.1, 9.2, 10.1, 10.2. And the servo controller set 12 receives the measurement signals of the displacement sensors. The electronic control device 11 reads the orientation parameters measured by the inertial measurement device 1, calculates the amount of extension/retraction of each suspension servo actuation cylinders 5.1, 5.2, 6.1, 6.2, 7.1, 7.2 required to cause the in-vehicle stable platform to return to a horizontal level, and outputs it to the servo controller set 12 to control the extension/retraction of the respective suspension servo actuation cylinders 5.1, 5.2,

6.1, 6.2, 7.1, 7.2, so as to maintain the in-vehicle stable platform horizontal during traveling.

This embodiment concerns a six-wheeled vehicle, the wheels of which are divided into three wheel groups, and each of the wheel groups includes two wheels close to each other. When grouped, the structure and the size of the wheels in some wheel group and the suspension servo actuation cylinders and the displacement sensors should be the same. In FIG. 2, the wheels 2.1 and 2.2 are in the first group, the wheels 3.1 and 3.2 are in the second group, and the wheels 4.1 and 4.2 are in the third group. The suspension servo actuation cylinders are also divided into three groups, in which the suspension servo actuation cylinders 5.1 and 5.2 are in the first group, the suspension servo actuation cylinders 6.1 and 6.2 are in the second group, and the suspension servo actuation cylinders 7.1 and 7.2 are in the third group. The displacement sensors are also divided into three groups, in which the displacement sensors 8.1 and 8.2 are in the first group, the displacement sensors 9.1 and 9.2 are in the second group, and the displacement sensors 10.1 and 10.2 are in the third group. Certainly, the number of the wheels in some wheel group may also be one, three or four. When the number of the wheels is less than six, such as four, the number of wheels in some wheel group can be one or two; when the number of wheels is greater than six, such as eight, the number of the wheels in some wheel group can be one or more, and so on. One wheel group forms a support point for supporting the vehicle body, and three wheel groups form three support points. According to the present disclosure, the orientation of the vehicle body can be controlled according to the principle that a plane is determined by three points. The support point for supporting the vehicle body of each of the wheel groups is the geometric center point of the support point for supporting the vehicle body of each of the suspension servo actuation cylinders in the group. The height of the support point can be controlled by controlling the average amount of the extension/retraction of each of the suspension servo actuation cylinders in the wheel group.

In this embodiment, the number of wheels in the three wheel groups is greater than one, so all of the suspension servo actuation cylinders in each of the wheel groups are communicated with each other in parallel, that is, upper chambers of the suspension servo actuation cylinders 5.1 and 5.2 are connected via an upper chamber connecting pipeline 15.2, and lower chambers are connected via a lower chamber connecting pipeline 15.1, so that the wheels in the first group form the first support point. Upper chambers of the suspension servo actuation cylinders 6.1 and 6.2 are connected via an upper chamber connecting pipeline 16.2, and lower chambers are connected via a lower chamber connecting pipeline 16.1, so that the wheels in the second group form a second support point. Upper chambers of the suspension servo actuation cylinders 7.1 and 7.2 are connected via an upper chamber connecting pipeline 17.1, and lower chambers are connected via a lower chamber connecting pipeline 17.2, so that the wheels in the third group form a third support point. The height of each of the support points is controlled by controlling the average amount of the extension/retraction of each of the suspension servo actuation cylinders in the group.

The specific control method of this embodiment includes the following steps:

In the first step, a coordinate system OXYZ that is fixedly connected with the vehicle body 13 is established. A coordinate origin O of the coordinate system is defined as a geometric center of all the wheel grounding points when the vehicle is horizontal. A positive direction of Z-axis is an upward direction passing through the origin O and perpendicular to a plane where the in-vehicle stable platform is located; a positive direction of Y-axis is a forward direction of the vehicle; a right direction when the vehicle moves forward is the positive direction of X-axis. A heaving displacement of the in-vehicle stable platform along the Z-axis is defined as w, a rotation angle around X-axis, i.e. a pitch angle is defined as $\alpha$, and a rotation angle around Y-axis, i.e. a roll angle is defined as $\beta$. In each of the scanning periods, the inertial measurement device 1 measures the pitch angle $\alpha_0$ and the roll angle $\beta_0$ and outputs them to the electronic control device 11.

In the second step, the electronic control device 11 performs a first-order low-pass filtering with cutoff frequency $f_L$ on the pitch angle $\alpha_0$ and the roll angle $\beta_0$, and the filtered pitch angle is set as $\alpha_L$, the filtered roll angle is set as $\beta_L$. The first-order digital low-pass filtering algorithm is as described in the Embodiment one, which will not repeated herein.

In the third step, according to the values of $\alpha_L$ and $\beta_L$ obtained in the second step, w=0 and $-\alpha_L$ and $-\beta_L$ are taken as a relative correction value of an orientation of the in-vehicle stable platform, a target value of an average amount of extension/retraction of each of the suspension servo actuation cylinders in each wheel group of the vehicle are calculated through an inverse kinematics algorithm of a vehicle suspension mechanism with three support points, and the target value is transmitted to the servo controller set to perform displacement servo control on the suspension servo actuation cylinders in each of the wheel groups, so as to maintain the in-vehicle stable platform horizontal during traveling.

The present disclosure provides a control method for an in-vehicle stable platform with more than three wheels, by which wheels of the in-vehicle stable platform system with more than three wheels are divided into three wheel groups, and the orientation of the vehicle body is controlled based on the principle that one plane is determined by three points, so that the control method is applicable to the vehicles with more than three wheels. According to the present disclosure, the pitch angle and the roll angle in each of the periods are scanned and monitored in real time, and the first-order low-pass filtering is performed on scanned values, so as to reduce the signal interference, and then the filtered pitch angle and the filtered roll angle are used for calculating the amount of extension/retraction of the suspension servo actuation cylinder in each of the wheel groups, so as to improve stability for controlling the in-vehicle stable platform. In the present disclosure, the wheels close to each other are selected to form a wheel group, so as to facilitate for the communication between the upper chambers and the lower chambers of the suspension servo actuation cylinders in the wheel group. At the same time, when grouped, the structure and the size of the wheels in the wheel group and the suspension servo actuation cylinders and the displacement sensors are the same, which is convenient to determine the support points of the wheel group.

During research and development process of the present disclosure, an orientation comparison test is carried out on a three-axle vehicle equipped with an active suspension system and a three-axle vehicle equipped with a passive hydro-pneumatic suspension system when traveling over triangle obstacles. The in-vehicle stable platform based on active suspension according to the present disclosure can achieve an effect of maintaining the platform horizontal and stable during traveling.

Figure 3:
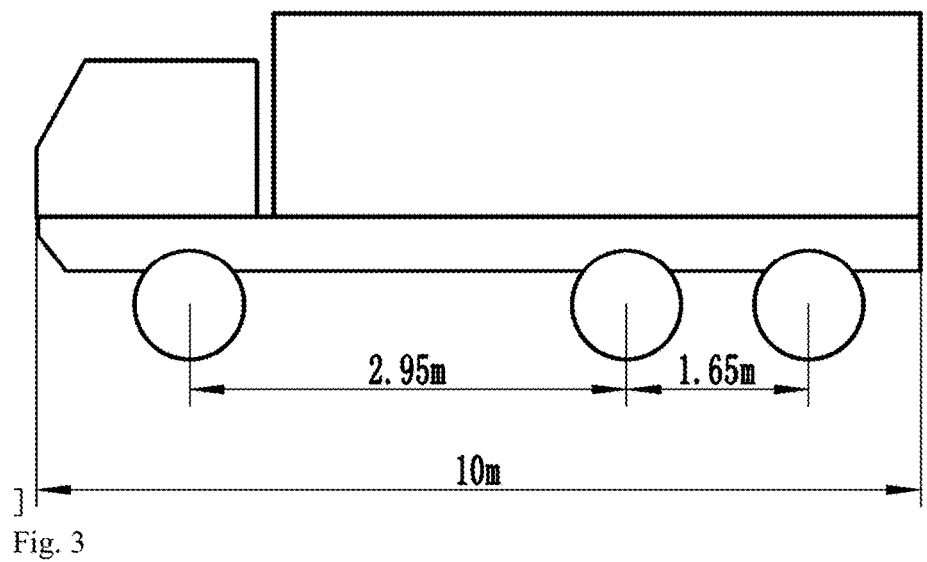
FIG. 3 is a schematic view of a three-axle vehicle used in a test.

The three-axle vehicle used in the test is shown in FIG. 3. The three-axle vehicle has a length of 10 m, a wheelbase of (2.95+1.65) m, an overall weight of 36 t, an shaft load of 12 t and a suspension stroke of ±0.11 m. In the test, one of the two three-axle vehicles is equipped with the active suspension system of the present disclosure and is controlled by the method of the present disclosure, and the other three-axle vehicle is equipped with the passive hydro-pneumatic suspension system. During the test, the upper chambers of the suspension servo actuation cylinders corresponding to the two front wheels of the three-shaft six-wheel vehicle are in communication through connecting pipelines, and the lower chambers of the suspension servo actuation cylinders corresponding to the two front wheels of the three-shaft six-wheel vehicle are in communication through connecting pipelines, such that the function of the front wheels and the suspensions supporting the vehicle body is equivalent to that of one supporting point; the upper chambers and the lower chambers of the suspension servo actuation cylinders corresponding to the two wheels on the right side of the two shafts on the rear of the vehicle are respectively in communication through connecting pipelines, such that the function of the two wheels on the right rear side supporting the vehicle body is equivalent to that of one supporting point; the upper chambers and the lower chambers of the suspension servo actuation cylinders corresponding to the two wheels on the left sides of the two shafts on the rear of the vehicle are respectively in communication through connecting pipelines, such that the function of the two wheels on the left rear side supporting the vehicle body is equivalent to that of one supporting point. In this way, the vehicle body totally has three supporting points. The four wheels and the suspension servo actuation cylinders at the rear of the vehicle have the same structure.

Figure 4:
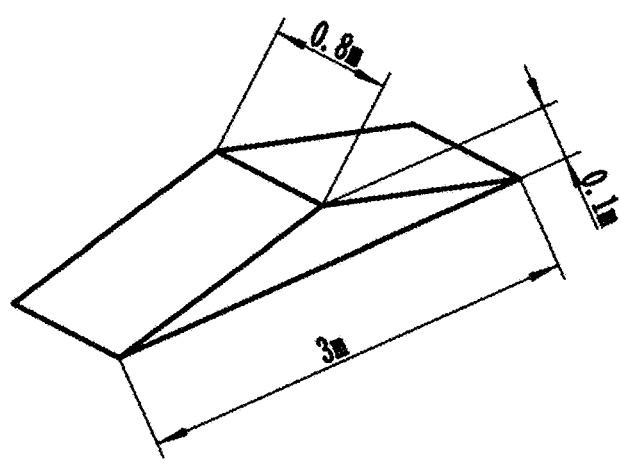
FIG. 4 is a schematic view of a triangle obstacle used in a test.

All triangle obstacles used in the test are shown in FIG. 4 and have a length of 3 m, a width of 0.8 m and a height of 0.1 m.

Figure 5:
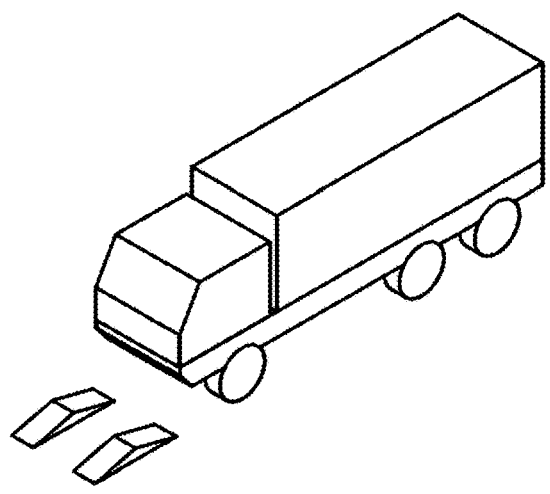
FIG. 5 is a schematic view of a test solution for measuring changes of a pitch angle.

FIG. 5 is a schematic view of s test scheme for measuring change of a pitch angle. In this test scheme, two triangular obstacles that are identical to each other are symmetrically placed based on a wheelbase, and the wheels on the left and right sides of the vehicle simultaneously cross the triangular obstacles, in this way, the changes of the pitch angle of the vehicle body can be measured.

Figure 6:
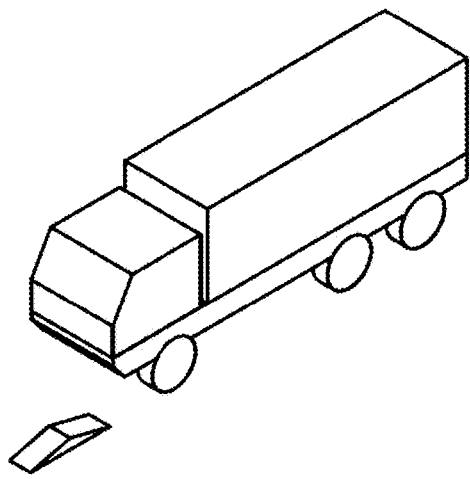
FIG. 6 is a schematic view of a test solution for measuring changes of a roll angle.

FIG. 6 is a schematic view of the test scheme for measuring change of the roll angle. In this test scheme, one triangle obstacle is only placed on one of the both sides of the vehicle, and the wheels of the vehicle on one side travel over the triangle obstacle, in this way, the changes of the roll angle of the vehicle body can be measured.

Figure 7:
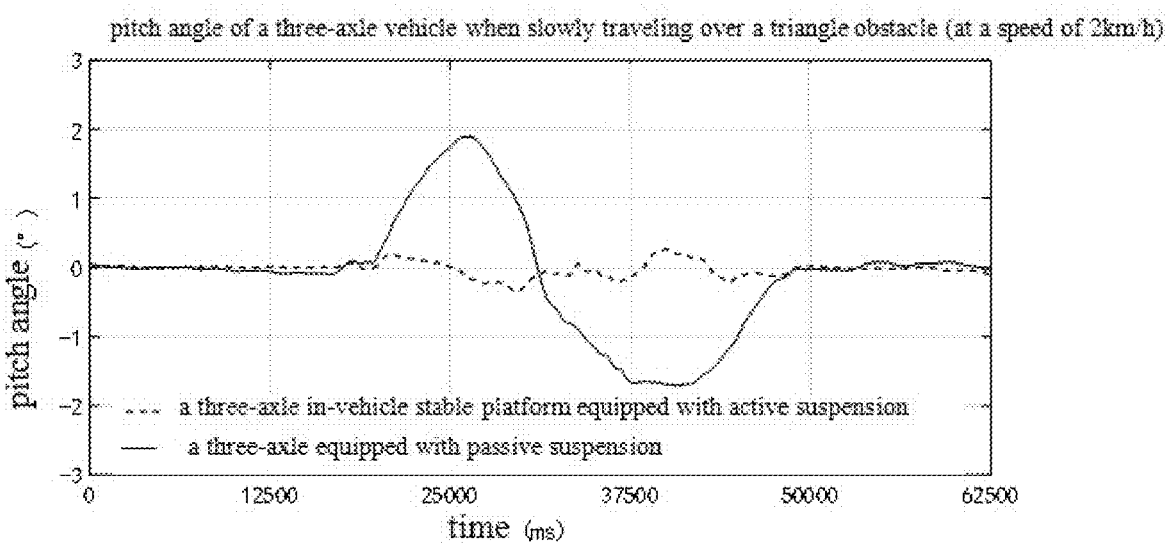
FIG. 7 is a comparative graph of changes of the pitch angles of vehicle bodies measured when a three-axle vehicle equipped with a passive hydro-pneumatic suspension system and a three-axle in-vehicle stable platform equipped with an active suspension system travel over a triangular obstacle.

FIG. 7 shows the changes of the pitch angle of the vehicle body of the three-axle in-vehicle stable platform equipped with an active suspension system and the three-axle vehicle equipped with a passive hydro-pneumatic suspension system when the wheels on both sides travel over the triangle obstacles at a speed of 2 km/h based on the test scheme shown in FIG. 5. It can be seen from FIG. 7 that when the three-axle in-vehicle stable platform equipped with an active suspension system travels over the triangle obstacle, the pitch angle thereof changes from −0.4° to 0.4° (shown by a dotted line in FIG. 7), and the change of the pitch angle only slightly increases compared with the change of the roll angle as moving on a flat road; when a three-axle vehicle equipped with a passive hydro-pneumatic suspension system travels over the triangular obstacle, the pitch angle thereof changes from −2° to 2° (shown by a solid line in FIG. 7), and compared with the three-axle vehicle equipped with a passive hydro-pneumatic suspension system, fluctuation of the pitch angle of the vehicle body of the three-axle in-vehicle stable platform equipped with an active suspension system is greatly reduced, so that the vehicle body is basically kept horizontal.

Figure 8:
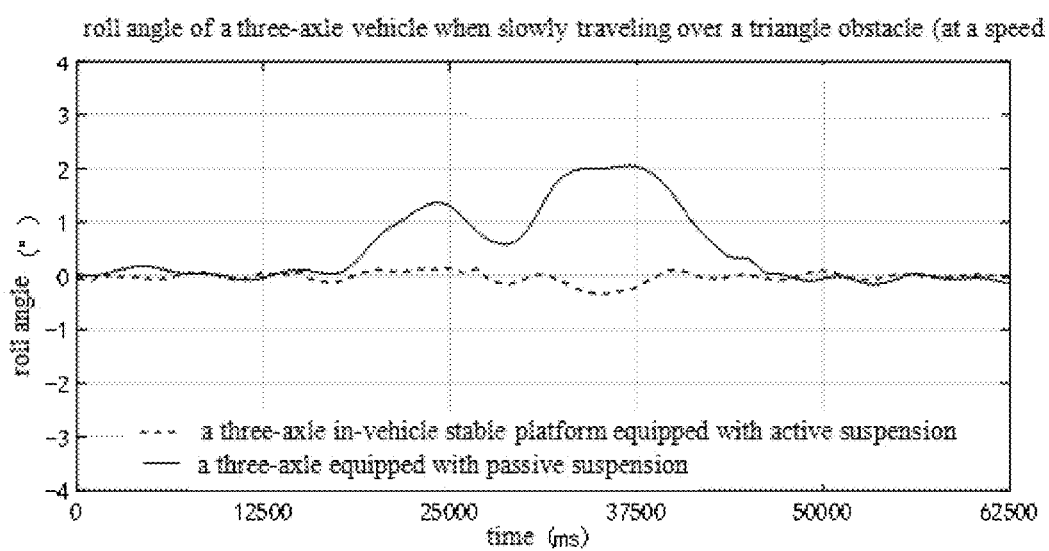
FIG. 8 is a comparative graph of changes of the roll angles of vehicle bodies measured when a three-axle vehicle equipped with a passive hydro-pneumatic suspension system and a three-axle in-vehicle stable platform equipped with an active suspension system travel over a triangular obstacle.

FIG. 8 shows changes of the roll angles of the vehicle body of the three-axle in-vehicle stable platform equipped with an active suspension system and the three-axle vehicle equipped with a passive hydro-pneumatic suspension system when the wheels on a single side travel over the triangle obstacle at a speed of 2 km/h based on the test scheme shown in FIG. 6. It can be seen from FIG. 8 that when the three-axle in-vehicle stable platform equipped with an active suspension system travels over the triangle obstacle, the roll angle thereof changes from −0.3° to 0.3° (shown by a dotted line in FIG. 8), and the change is not obvious different from that of the roll angle as moving on the flat road; when a three-axle vehicle equipped with a passive hydro-pneumatic suspension system travels over a triangular obstacle, the roll angle thereof changes from −1° to 2° (shown by a solid line in FIG. 8), as compared with a three-axle vehicle equipped with a passive hydro-pneumatic suspension system, fluctuation of the roll angle of the three-axle in-vehicle stable platform equipped with an active suspension system of the present disclosure is greatly reduced, so that the vehicle body is basically kept horizontal. In this way, the in-vehicle stable platform of the present disclosure can keep the vehicle body stable during the movement, and the operation on the in-vehicle stable platform of the present disclosure will not be interfered by the movement of the vehicle, for example, the wheeled crane can lift and hoist while traveling, and no roll over accident will occur.

Ultimately, it should be noted that the above-mentioned embodiments are only used to illustrate the technical solution of the present disclosure, rather than limit the present disclosure. Although the present disclosure has been described in detail with reference to the foregoing embodiments, it should be understood by the person skilled in the art that it is allowable to modify the technical solution described in the foregoing embodiments or equivalently substituting some or all of the technical features; however, these modifications or substitutions do not cause the corresponding technical solutions to substantively depart from the scope of the technical solutions of various embodiments of the present disclosure.

What is claimed is:

1. A control method of an orientation of a vehicle employing active suspension, characterized in that the vehicle has three or more wheels, the wheels are divided into three groups, which constitute three support points for supporting a vehicle body; heights of the three support points are controlled to control an orientation of the vehicle body; each of the wheel groups has one wheel or multiple wheels therein, when the number of wheels in some wheel group is greater than one, upper chambers and lower chambers of all of the suspension servo actuation cylinders in the wheel group are respectively communicated, and the wheel group forms a support point for supporting the vehicle body, three wheel groups form three support points, so that the orientation of the vehicle body is controlled according to a principle that a plane is determined by three points;

wherein the vehicle comprises a vehicle body, an inertial measurement device, an electronic control device, a servo controller set, multiple wheels, suspension servo actuation cylinders and displacement sensors respectively corresponding to the wheels, wherein the wheels are connected to a lower part of the vehicle body via the suspension servo actuation cylinders, and the displacement sensor is used to measure strokes of the suspension servo actuation cylinders, the electronic control device and servo controller set are secured to the vehicle body, the electronic control device is in communication with the inertial measurement device and the servo controller set, and the servo controller set is in communication with the displacement sensor, the electronic control device reads an orientation parameter measured by the inertial measurement device, calculates an amount of extension/retraction of each of the suspension servo actuation cylinders required to cause the vehicle body to return to a horizontal level, and outputs it to servo controller set, thereby controlling the extension/retraction of each of the suspension servo actuation cylinders;

wherein when the wheel groups are formed, the structures of the wheels in each of the wheel groups and the suspension servo actuation cylinders corresponding thereto and the displacement sensors are the same, and a support point supporting the vehicle body in each of the wheel groups is a geometric center point of the support point of each of the suspension servo actuation cylinders in the group to the vehicle body, and the height of the support point is controlled by controlling the average amount of extension/retraction of each of the suspension servo actuation cylinders in the group.

2. The control method of the orientation of the vehicle employing active suspension according to claim 1, characterized in that, the method comprises establishing a coordinate system OXYZ fixedly connected with the vehicle body, wherein a coordinate origin O is a centroid of wheel grounding points when the vehicle is horizontal, and an upward direction passing through the coordinate origin O and perpendicular to the plane where an in-vehicle stable platform is located is defined as a Z-axis positive direction, a forward direction of the vehicle is defined as a Y-axis positive direction, and a right direction when the vehicle moves forward is defined as an X-axis positive direction, a heaving displacement of the in-vehicle stable platform along the Z-axis is set as w, a rotation angle around the X-axis is set as a, and a rotation angle around the Y-axis is set as β; scanning periods are preset in the inertial measurement device, and the control method comprises the following steps:

in the first step, in each of the scanning periods, the inertial measurement device measures a pitch angle $\alpha_0$ and a roll angle $\beta_0$ and outputs them to the electronic control device;

in the second step, the electronic control device performs a first-order low-pass filtering with a cutoff frequency $f_L$ on the pitch angle $\alpha_0$ and the roll angle $\beta_0$, and a filtered pitch angle is $\alpha_L$, a filtered roll angle is $\beta_L$, the first-order digital low-pass filtering adopts a following recursive algorithm:

$$y_n = a x_n + (1-a) y_{n-1}$$

wherein, $x_n$ is a sampling value of $\alpha_0$ or $\beta_0$ in the current scanning period, $y_n$ is a calculating value of $\alpha_0$ or $\beta_0$ in the current scanning period, $y_{n-1}$ is a calculating value of $\alpha_0$ or $\beta_0$ in the previous scanning period, and a is a filter coefficient;

in the case that the cut-off frequency $f_L$ is determined, the calculation method of a is:

$$a = 2\pi f_L \Delta t$$

wherein $\Delta t$ is the scanning period, an unit of which is s; $f_L$ is the cut-off frequency, an unit of which is Hz;

in the third step, according to the values of $\alpha_L$ and $\beta_L$ obtained in the previous second step, the electronic control device takes w=0 and $-\alpha_L$ and $-\beta_L$ as relative correction values of the orientation of the in-vehicle stable platform, calculates the target values of the amount of extension/retraction of the suspension servo actuation cylinders of the vehicle, and transmits the target values to the servo controller set to perform displacement servo control on the suspension servo actuation cylinders, so as to cause the in-vehicle stable platform to be horizontal during traveling; when the target values of the amount of the extension/retraction of the suspension servo actuation cylinders are calculated by an inverse kinematics algorithm of a vehicle suspension mechanism with the three support points; when the servo controller set performs displacement control on the suspension servo actuation cylinders, the extension/retraction of the suspension servo actuation cylinders is controlled according to target values of the stroke and the amount of the extension/retraction of the suspension servo actuation cylinder measured by the displacement sensor, so as to cause the in-vehicle stable platform to be horizontal during traveling.

3. An in-vehicle stable platform employing active suspension for a six-wheeled vehicle, characterized in that, the in-vehicle stable platform comprises a vehicle body (13), an in-vehicle stable platform (14) fixedly connected with the vehicle body, an inertial measurement device (1), an electronic control device (11), a servo controller set (12), wheels (2.1, 2.2, 3.1, 3.2, 4.1, 4.2), suspension servo actuation cylinders (5.1, 5.2, 6.1, 6.2, 7.1, 7.2) corresponding to the wheels (2.1, 2.2, 3.1, 3.2, 4.1, 4.2) one by one, and corresponding displacement sensors (8.1, 8.2, 9.1, 9.2, 10.1, 10.2);

wherein the inertial measurement device (1) is secured to the in-vehicle stable platform (14), and wheels (2.1, 2.2, 3.1, 3.2, 4.1, 4.2) are connected to a lower part of the vehicle body via the suspension servo cylinders (5.1, 5.2, 6.1, 6.2, 7.1, 7.2) respectively; the displacement sensors (8.1, 8.2, 9.1, 9.2, 10.1, 10.2) are used to measure strokes of the suspension servo actuation cylinders (5.1, 5.2, 6.1, 6.2, 7.1, 7.2), respectively, the electronic control device (11) and the servo controller set (12) are secured to the vehicle body (13), the electronic control device (11) is in communication with the inertial measurement device (1) and the servo controller set (12), the servo controller set (12) is in communication with the displacement sensors (8.1, 8.2, 9.1, 9.2, 10.1, 10.2), and the servo controller set (12) receives the measurement signals of the displacement sensors, the electronic control device (11) reads the orientation parameters measured by the inertial measurement device (1), calculates an amount of extension/retraction of each of the suspension servo actuation cylinders (5.1, 5.2, 6.1, 6.2, 7.1, 7.2) required to cause the in-vehicle stable platform to return to a horizontal level, and outputs it to the servo controller set (12) to control the extension/retraction of each of the suspension servo actuation cylinders (5.1, 5.2, 6.1, 6.2, 7.1, 7.2), so as to cause the in-vehicle stable platform to be horizontal during traveling;

wherein the wheels are divided into three wheel groups, and each of the wheel groups includes two wheels close to one another, when groups are formed, the structure and size of the wheels in some wheel group and the suspension servo actuation cylinder and the displacement sensor are the same, in which the wheels (2.1 and 2.2) are a first group, the wheels (3.1 and 3.2) are a second group, and the wheels (4.1 and 4.2) are a third group; the suspension servo actuation cylinders are also divided into three groups, in which the suspension servo actuation cylinders (5.1 and 5.2) are a first group, the suspension servo actuation cylinders (6.1 and 6.2) are a second group, and the suspension servo actuation cylinders (7.1 and 7.2) are a third group; the displacement sensors are also divided into three groups, in which the displacement sensors (8.1 and 8.2) are a first group, the displacement sensors (9.1 and 9.2) are a second group, and the displacement sensors (10.1 and 10.2) are a third group; upper chambers of the suspension servo actuation cylinders (5.1 and 5.2) are connected via an upper chamber connecting pipeline (15.2), and lower chambers thereof are connected via a lower chamber connecting pipeline (15.1), so that the wheels in the first group form a first support point upper chambers of the suspension servo actuation cylinders (6.1 and 6.2) are connected via an upper chamber connecting pipeline (16.2), and lower chambers thereof are connected via a lower chamber connecting pipeline (16.1), so that the wheels in the second group form a second support point upper chambers of the suspension servo actuation cylinders (7.1 and 7.2) are connected via an upper chamber connecting pipeline (17.1), and lower chambers thereof are connected via a lower chamber connecting pipeline (17.2), so that the wheels in the third group form a third support point a height of each of the support point is controlled by controlling an average amount of extension/retraction of each of the suspension servo actuation cylinders in the group;

wherein the control method of the in-vehicle stable platform employing active suspension for a six-wheeled vehicle comprises in the first step, a coordinate system OXYZ is established and fixedly connected with the vehicle body, a coordinate origin O of the coordinate system is defined as a centroid of all wheel grounding points when the vehicle is horizontal, a positive direction of a Z-axis is an upward direction passing through the origin O and perpendicular to a plane where the in-vehicle stable platform is located; a positive direction of a Y-axis is a forward direction of the vehicle; a right direction when the vehicle moves forward is a positive direction of a X-axis, a heaving displacement of the in-vehicle stable platform along the Z-axis is defined as w, a rotation angle around the X-axis, i.e. a pitch angle is defined as $\alpha$, and a rotation angle around the Y-axis, i.e. a roll angle is defined as $\beta$; in each of scanning periods, the inertial measurement device measures the pitch angle $\alpha_0$ and the roll angle $\beta_0$ and outputs them to the electronic control device;

in the second step, the electronic control device performs a first-order low-pass filtering with a cutoff frequency $f_L$ on the pitch angle $\alpha_0$ and the roll angle $\beta_0$, and a filtered pitch angle is set as $\alpha_L$, a filtered roll angle is set as $\beta_L$, in the third step, according to values of $\alpha_L$ and $\beta_L$ obtained in the second step, w=0 and $-\alpha_L$ and $-\beta_L$, are taken as a relative correction value of an orientation of the in-vehicle stable platform, a target value of an average amount of extension/retraction of each of the suspension servo actuation cylinders in each of the wheel groups of the vehicle is calculated through an inverse kinematics algorithm of a vehicle suspension mechanism with three support points, and a target value is transmitted to the servo controller set to perform displacement servo control on the suspension servo actuation cylinders in the wheel groups, so as to cause the in-vehicle stable platform to be horizontal during traveling.

\* \* \* \* \*